United States Patent [19]
Pettitt et al.

[11] Patent Number: 5,483,233
[45] Date of Patent: Jan. 9, 1996

[54] ANALOGUE TELEMETRY SYSTEM AND METHOD FOR FAULT DETECTION IN OPTICAL TRANSMISSION SYSTEMS

[75] Inventors: Martin J. Pettitt, Clayton, Australia; Anagnostis Hadjifotiou, Harlow, United Kingdom

[73] Assignee: Northern Telecom Limited, Montreal, Canada

[21] Appl. No.: 152,243

[22] Filed: Nov. 12, 1993

Related U.S. Application Data

[63] Continuation of Ser. No. 715,338, Jun. 14, 1991, abandoned.

[30] Foreign Application Priority Data

Jun. 16, 1990 [GB] United Kingdom ................... 9013513

[51] Int. Cl.$^6$ ..................................................... G08C 19/16
[52] U.S. Cl. ............................. 340/870.26; 340/870.09; 340/825.16; 359/174; 359/341; 371/20.2; 372/6; 372/26; 372/28
[58] Field of Search ..................... 340/825.16, 825.71, 340/870.09, 870.26; 455/8, 67.1; 359/110, 174, 176, 177, 341, 344, 345; 379/2, 4, 22, 26; 370/13.1, 14; 371/20.1, 20.2, 20.3; 372/6, 28, 38, 26

[56] References Cited

U.S. PATENT DOCUMENTS

| | | | |
|---|---|---|---|
| 4,468,773 | 8/1984 | Seaton | 372/28 |
| 5,087,108 | 2/1992 | Grasso et al. | 359/341 |
| 5,117,196 | 5/1992 | Epworth et al. | 359/174 |

FOREIGN PATENT DOCUMENTS

| | | | |
|---|---|---|---|
| 0331304 | 9/1989 | European Pat. Off. | |
| 415438 | 3/1991 | European Pat. Off. | 359/174 |
| 1211275 | 2/1966 | Germany . | |
| 2823847 | 8/1979 | Germany . | |
| 57-5447 | 1/1982 | Japan | 371/20.2 |

Primary Examiner—John K. Peng
Assistant Examiner—Andrew Hill
Attorney, Agent, or Firm—Lee, Mann, Smith, McWilliams, Sweeney & Ohlson

[57] ABSTRACT

An analogue telemetry system/method provides fault location in an optical transmission system including optical fibre amplifiers. Each amplifier includes an optical fibre amplifier with an AGC loop therearound, a respective optical pump source being included in the AGC loop. In the AGC loop the spontaneous emissions from the amplifier fibre is detected and employed to drive the pump source appropriately to maintain the amplifier output at a predetermined level. A supervisory tone is applied at the transmission end of the system. At each amplifier the presence of the supervisory tone or a distress tone from a previous amplifier is looked for. If either tone is detected the signal is amplified and transmitted to the next amplifier. If neither tone is detected a respective amplifier distress tone is applied to the respective optical pump source. At the receiver end of the system the supervisory tone is sought or, in its absence, a distress tone or no tone at all from this information the position of a system fault determined.

7 Claims, 2 Drawing Sheets

ANALOGUE TELEMETRY SYSTEM AND METHOD FOR FAULT DETECTION IN OPTICAL TRANSMISSION SYSTEMS

This application is a continuation of application Ser. No. 715,338, filed Jun. 14, 1991 abandoned.

BACKGROUND OF THE INVENTION

This invention relates to telemetry and in particular to analogue telemetry systems and methods for concatenated optical amplifier systems.

Optical amplifiers such as those based on specially doped fibres or semiconductor materials are likely to be employed in future long haul optical fibre cable transmission routes since they can provide considerable enhancement thereto. They will be able to directly to amplify the optical signal and therefore simplify the intermediate repeater stages by eliminating the need to perform full 3R (re-shaping, re-timing, re-generation) signal transmission. A system including a plurality of optical amplifiers should have some facility for diagnosing where a fault has occurred and referring this information to one of the terminal stations of the system.

SUMMARY OF THE INVENTION

According to one aspect of the present invention there is provided an analogue telemetry system for use with an optical transmission system including a transmission terminal, a plurality of concatenated optical amplifiers and a receiver terminal, all interconnected by optical fibre, the telemetry system including means for applying a supervisory tone to the optical output from the transmission terminal, means at each optical amplifier for detecting the presence of the supervisory tone or a distress tone from any preceding amplifier, for amplifying the incoming signal if either of said tones is present, and for applying a respective distress tone to the amplifier's output if neither of said tones is present, and means at the receiver terminal for detecting the presence of the supervisory tone, a said distress tone or the absence of all such tones, the latter or the received distress tone serving to locate a transmission system fault.

According to another aspect of the present invention there is provided an analogue telemetry method for use with an optical transmission system including a transmission terminal, a plurality of concatenated optical amplifiers and a receiver terminal, all interconnected by optical fibre, the method including the steps of applying a supervisory tone to the optical output from the transmission terminal, detecting, at each optical amplifier, the presence of the supervisory tone or a distress tone from any preceding amplifier, amplifying the incoming signal for transmission to the next amplifier if either of said tones is present or applying a respective distress tone to the amplifier's output if neither tone is present, detecting at the receiver terminal the presence of the supervisory tone, a said distress tone, or the absence of all such tones, and determining from the latter or the received distress tone the location of a transmission system fault.

BRIEF DESCRIPTION OF THE DRAWINGS

Embodiments of the invention will now be described with respect to the accompanying drawings, in which.

DESCRIPTION OF THE PREFERRED EMBODIMENTS

Figure 1:
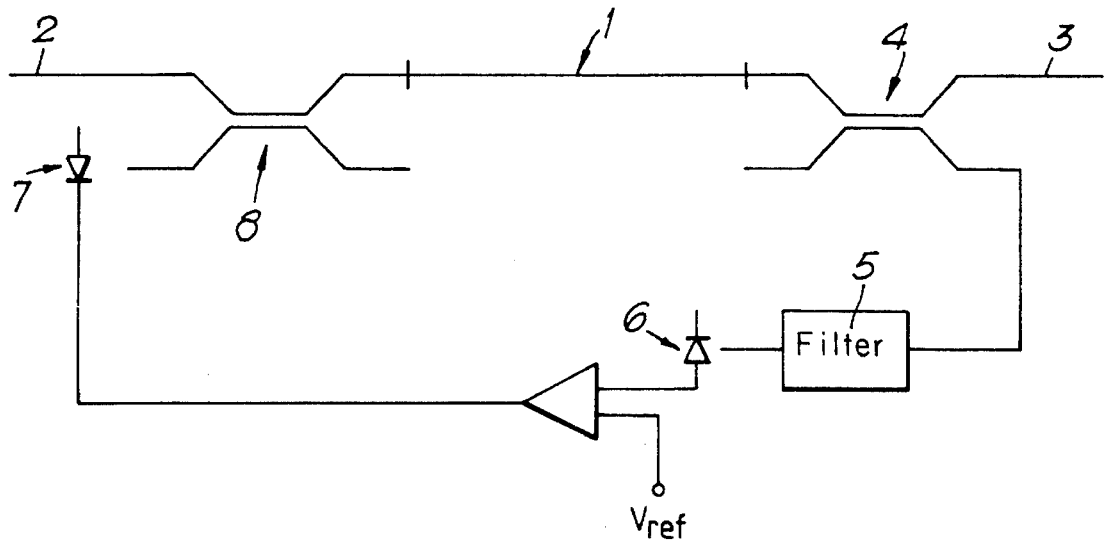
FIG. 1 illustrates a fibre amplifier and a simple AGC therefor.

In a long haul optical fibre transmission system there are many parameters, such as fibre section loss and fibre to amplifier coupling, which will have tolerance placed upon them. Therefore the exact gain required from each stage of the system will need to be adjusted to maintain the signal on the amplifier output at the desired level. This requires some form of signal automatic gain control (AGC) around each individual amplifier. A simple form of AGC loop is shown in FIG. 1 for an optical fibre amplifier 1, typically an erbium doped silica optical fibre amplifier. A received optical signal, which was transmitted from a transmitter laser (not shown) at a terminal station, is input at 2 and the amplified optical signal is output at 3. A small portion of the output from the amplifier is tapped off via fibre coupler 4 and applied to a narrowband optical filter 5 which serves to filter the spontaneous emission therefrom. This spontaneous emission, detected at 6, is used to drive pump laser 7. The optical output of pump laser 7 is coupled to the amplifying fibre 1 via a fibre coupler 8. In the simple AGC implementation illustrated in FIG. 1, the voltage produced by the detected spontaneous emission is merely compared with a reference voltage and the pump laser driven appropriately.

Figure 2:
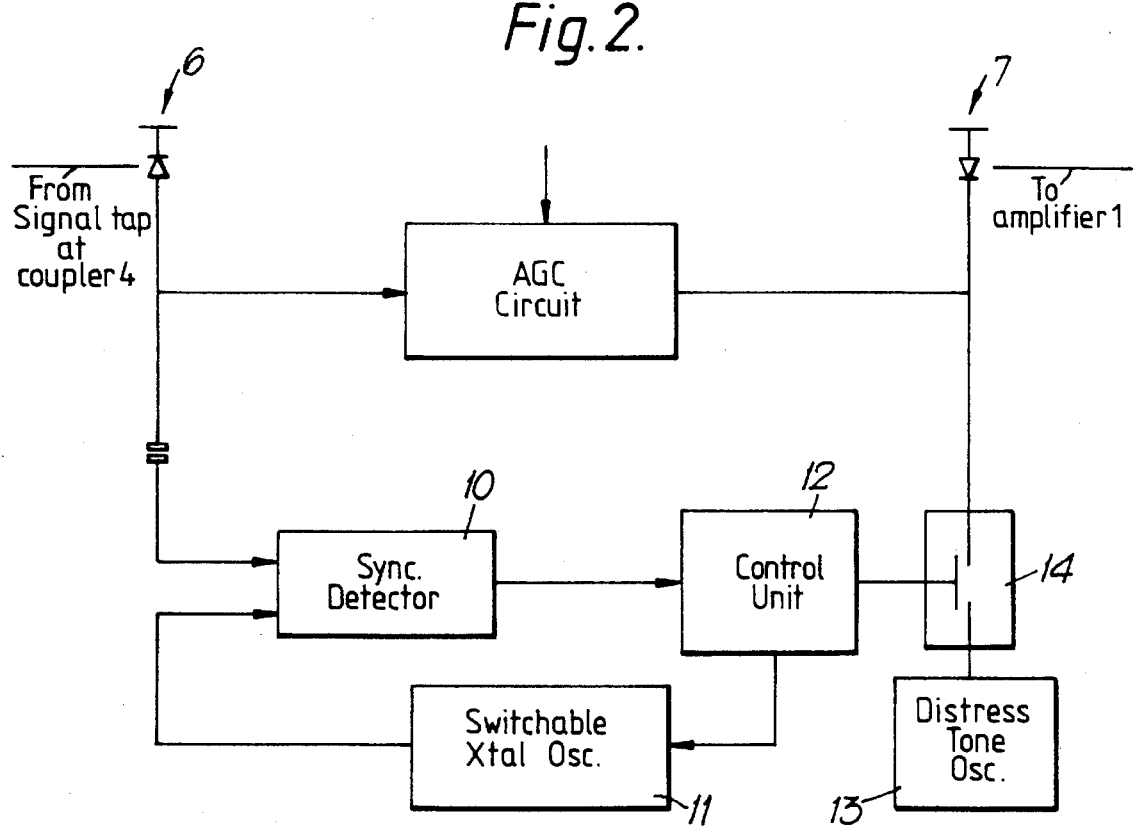
FIG. 2 illustrates an analogue telemetry system for an optical fibre amplifier.

The telemetry system proposed by the present invention can be implemented in conjunction with an optical AGC loop such as that described with reference to FIG. 1. The telemetry and AGC circuitry required at the optical amplifier is shown in FIG. 2, which uses the same reference numerals as FIG. 1 where appropriate. A supervisory tone is superimposed on the optical data at a frequency around 100 kHz. This is just above the crosstalk cut off frequency of the optical amplifier (fibre 1) and therefore will not affect the optical gain control system through interaction with the pump. The supervisory tone is applied at the transmitter laser (not shown) of the terminal station. The supervisory tone can be picked out from a signal tap, such as through the narrowband filter 5 and detector 6 which are used to detect the signal for AGC purposes. The frequency of the detected tone is compared in a synchronous detection circuit 10 with that output by a crystal oscillator 11. For the first amplifier of a chain the oscillation frequency will be that of the supervisory tone and a control unit 12 is not required. For subsequent amplifiers the oscillator 11 is switchable to different frequencies by the control unit. In the case of a switchable crystal oscillator it first outputs the frequency of the supervisory tone. If the frequencies are the same, the presence of the supervisory tone is confirmed and thus that there is a continuous optical path up to that specific amplifier. In this case the supervisory tone and the optical data signal are both optically amplified and output at 3 for transmission down the line (optical transmission fibre) to the next amplifier.

If the supervisory tone is not present at the first amplifier in the chain it is implied that the optical path to that amplifier is not continuous. This amplifier then needs to alert the receiving terminal of the fault and it can do this by sending out a distress tone, at a frequency different to the supervisory tone, to the subsequent amplifiers in the system. This can be done by superimposing a low frequency modulation, such as generated by distress tone oscillator 13, onto the amplifier pump laser 7, which in turn is transferred to the spontaneous emission from the fibre amplifier 1 and relayed down the line to the receiving terminal station. A latch (switch unit) 14 is held open by the synchronisation detector 10 of the first amplifier of the chain if the supervisory tone is present. If it is not detected, the latch switches in the distress tone oscillator 13 to apply the distress tone modulation to the pump laser 7. The distress tones are unique to each amplifier.

If the supervisory tone is not present at the first amplifier, the second amplifier will receive the distress tone associated with the first amplifier. The second and subsequent amplifiers include the switchable crystal oscillator 11 and the control unit 12 which serves to switch the oscillator to output first the supervisory tone frequency and then, in turn, the distress tone frequencies of each preceding amplifier. If any of these tones is present, that amplifier does not issue its own tone but simply amplifies the received signal. Hence at the receiving terminal a single tone will be received which is either the supervisory tone or the distress signal from the first amplifier in the chain from which the supervisory tone was absent. Hence the position of the system fault can be readily determined. In the event of system failure between the last amplifier of the chain and the receiver terminal, no supervisory or distress tone will be received. Such a method/ arrangement requires relatively simple diagnostic electronics at the receiver terminal but requires a certain amount of intelligence to be placed at the amplifiers. In comparison with the telemetry method/system disclosed in our co-pending GB Application No 9013512.0 (Ser. No 2245/ 120A) (M J Pettitt A Hadjifotiou 2-1) (corresponding to U.S. patent application Ser. No. 07/715339 filed Jun. 14, 1991) less diagnostic electronics is required at the receiver terminal but more intelligence is required at the amplifiers, which in the case of a submarine system will be underwater and thus not easily accessible.

To summarise, the analogue telemetry system/method described above involve detecting whether a supervisory tone is present on an incoming optical signal. If no supervisory tone is present, then the presence of any distress tone from a preceding amplifier is checked for. If any of these tones is present the signal is amplified in the normal way, if not, a tone unique to that amplifier is emitted on the spontaneous emission by modulating the optical pump.

Figure 3:
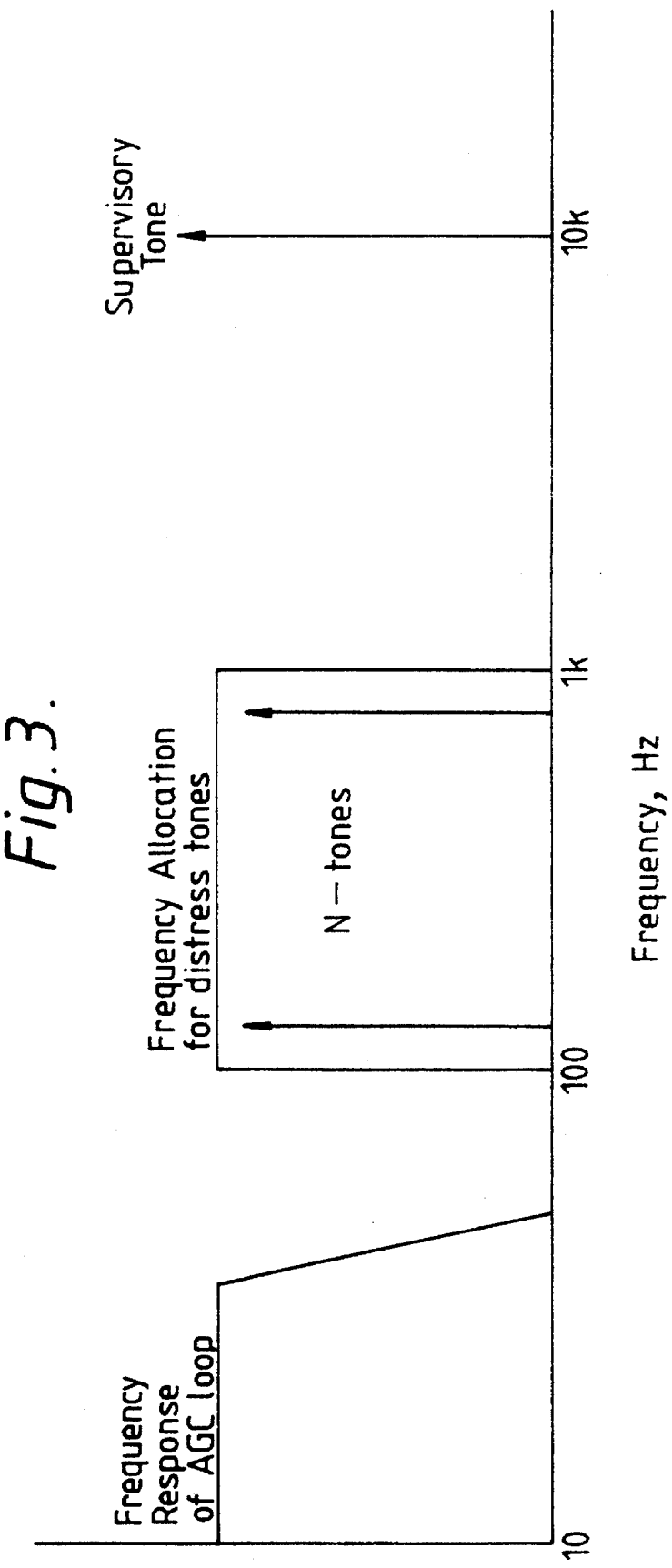
FIG. 3 illustrates a possible telemetry frequency allocation spectrum.
Figure 4:
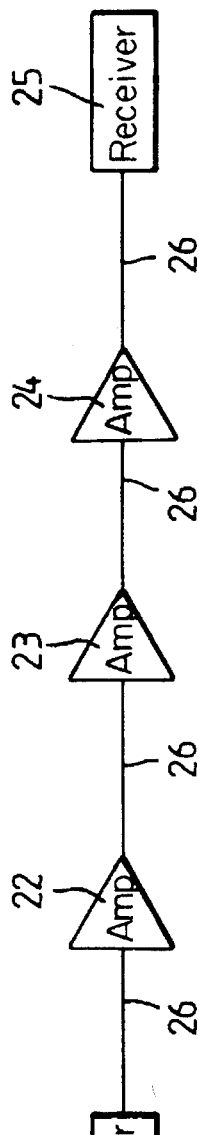
FIG. 4 illustrates, schematically, an optical transmission system.

The frequency allocation of the tones needs to be carefully determined. It should be above the AGC control loop bandwidth and below the frequency at which pump modulation is no longer transferred to the spontaneous output. A possible frequency allocation range is illustrated in FIG. 3. Whilst the invention has been specifically described with reference to optical fibre amplifiers it is equally applicable to other optical amplifiers. FIG. 4 illustrates the optical transmission system to which the invention is applicable. It comprises a transmission terminal 21, optical amplifiers 22, 23, 24, and a receiver terminal 25, all interconnected by optical fibre 26.

We claim:

1. An analogue telemetry system for use with an optical transmission system including a transmitter terminal having an optical output, a plurality of concatenated optical fibre amplifiers, each having a respective optical pump source comprising a laser, and a receiver terminal, all interconnected by optical fibre, each optical fibre amplifier including an optical amplifier fibre with an automatic gain control (AGC) loop therearound, the respective optical pump source being included in the respective AGC loop, wherein in the AGC Loop spontaneous emission from the optical amplifier is detected and employed to drive the respective laser pump source appropriately to maintain the optical fibre amplifier output at a predetermined level, the telemetry system including means for applying a supervisory tone to the optical output from the transmitter terminal, means at each said optical amplifier for selectively applying to that amplifier's output a distress tone at a frequency unique to that amplifier and different from that of the supervisory tone by superimposing a respective modulation on to that amplifier's laser pump source which respective modulation is in turn transferred to the optical amplifier fibre's spontaneous emission, means at each optical fibre amplifier for detecting the presence of either the supervisory tone or a distress tone from any preceding amplifier, and amplifying the incoming signal if either of said tones is present, and wherein each optical fibre amplifier is arranged to apply its respective distress tone characteristic of that amplifier to the amplifier's output if neither of said supervisory or distress tones are present, and wherein means are provided at the receiver terminal for detecting the presence of the supervisory tone, a said distress tone or the absence of either such tones, the latter or the received distress tone serving to indicate and locate a transmission system fault.

2. A telemetry system as claimed in claim 1, wherein the distress tones are within a frequency band above the optical amplifier AGC loop bandwidth and below the frequency at which the pump's modulation is no longer transferred to the spontaneous emission from the optical amplifier fibres.

3. A telemetry system as claimed in claim 1 wherein the tone detecting means at the optical fibre amplifiers includes a synchronous detector.

4. A telemetry system as claimed in claim 3 wherein the synchronous detector is coupled to a switchable oscillator via control means which serve to switch the oscillator whereby it first outputs the supervisory tone frequency and then in turn the distress tone frequency of each preceding amplifier.

5. A telemetry system as claimed in claim 4 further including a switch unit which is held open when the supervisory tone or a distress tone is detected but which is closed when neither tone is present when it serves to connect a distress tone generator to the optical pump source of the respective amplifier.

6. An analogue telemetry method for use with an optical transmission system including a transmitter terminal having an optical output, a plurality of concatenated optical fibre amplifiers, each having a respective optical pump source comprising a laser, and a receiver terminal, all interconnected by optical fibre, each optical fibre amplifier including an optical amplifier fibre with an automatic gain control (AGC) Loop therearound, the respective optical pump source being included in the respective AGC loop, each said optical amplifier having means for applying a distress tone at a frequency unique to that amplifier and different from that of the supervisory tone by superimposing a respective modulation on to that amplifier's laser pump source which respective modulation is in turn transferred to the optical amplifier fibre's spontaneous emission, the method including the steps of detecting in the AGC loops spontaneous emission from the optical amplifier fibres and employing the detected spontaneous emission to drive the respective laser pump sources appropriately to maintain the optical fibre amplifiers outputs at a predetermined level, applying a supervisory tone to the optical output from the transmitter terminal, detecting, at each optical fibre amplifier, the presence of either the supervisory tone or a distress tone from any preceding amplifier, amplifying the incoming signal for transmission to the next amplifier if either of said tones is present or applying its respective distress tone characteristic of that amplifier to the amplifier's output if neither tone is present, detecting at the receiver terminal the presence of the supervisory tone, a said distress tone, or the absence of either such tones, and determining from the latter or the received distress tone the location of a transmission system fault.

7. A method as claimed in claim 6 wherein the tones are detected at the optical fibre amplifiers by means including a synchronous detector coupled to a switchable oscillator via control means which serve to switch the oscillator whereby it first outputs the supervisory tone frequency and then in turn the distress tone frequency of each preceding amplifier.

* * * * *